(12) United States Patent
Liu et al.

(10) Patent No.: US 11,076,438 B2
(45) Date of Patent: Jul. 27, 2021

(54) NETWORKING METHOD AND SYSTEM FOR WIRELESS NETWORKS

(71) Applicant: Zhejiang Future Technology Institute (jiaxing), Jiaxing (CN)

(72) Inventors: Shuangwen Liu, Jiaxing (CN); Lei Liu, San Ramon, CA (US); Bin Hu, Jiaxing (CN); Wei Cao, Jiaxing (CN)

( * ) Notice: Subject to any disclaimer, the term of this patent is extended or adjusted under 35 U.S.C. 154(b) by 67 days.

(21) Appl. No.: 16/670,711

(22) Filed: Oct. 31, 2019

(65) Prior Publication Data
US 2021/0100055 A1   Apr. 1, 2021

(30) Foreign Application Priority Data

Sep. 26, 2019 (CN) .......................... 201910918444.6

(51) Int. Cl.
| | |
|---|---|
| *H04L 12/24* | (2006.01) |
| *H04W 76/18* | (2018.01) |
| *H04W 76/11* | (2018.01) |
| *H04W 4/80* | (2018.01) |
| *H04W 52/02* | (2009.01) |
| *H04W 84/18* | (2009.01) |

(52) U.S. Cl.
CPC ......... *H04W 76/18* (2018.02); *H04L 41/0668* (2013.01); *H04L 41/0806* (2013.01); *H04W 76/11* (2018.02); *H04W 4/80* (2018.02); *H04W 52/0235* (2013.01); *H04W 84/18* (2013.01)

(58) Field of Classification Search
CPC . H04W 76/18; H04W 76/11; H04W 52/0235; H04W 84/18; H04W 4/80; H04L 41/0668; H04L 41/0806

USPC ........................................................ 370/221
See application file for complete search history.

(56) References Cited

U.S. PATENT DOCUMENTS

| | | | | |
|---|---|---|---|---|
| 2005/0266807 | A1* | 12/2005 | Goto ....................... | H04L 12/28 455/88 |
| 2007/0258508 | A1* | 11/2007 | Werb ....................... | H04L 9/083 375/140 |
| 2009/0147714 | A1* | 6/2009 | Jain ....................... | H04W 52/0216 370/311 |
| 2009/0204348 | A1* | 8/2009 | Davis ....................... | H04L 67/18 702/60 |

(Continued)

*Primary Examiner* — Robert J Lopata
(74) *Attorney, Agent, or Firm* — Jigang Jin

(57) ABSTRACT

A network node of a local area wireless network preferentially tries to connect with a first node having the primary connection relationship with the network node in a first connection time window; when the network node fails to connect with the first node under a predetermined condition, the network node tries to connect with a second node having the backup connection relationship with the network node in a second connection time window. After the network node is connected with and finishes communicating with the first or second node, the network node enters into standby or dormancy state and tries to establish connection in a subsequent first connection time window or a second connection time window. By using priority or backup routing method and setting connection time window, the power consumption management and networking management mechanism of each node of the network are simplified. Each network node can operate at a low power consumption level. Networking routes have certain degrees of freedom and can meet the network robustness requirements.

18 Claims, 3 Drawing Sheets

(56) References Cited

U.S. PATENT DOCUMENTS

| | | | | |
|---|---|---|---|---|
| 2012/0158343 A1* | 6/2012 | Yoo | ...................... | H04W 84/18 |
| | | | | 702/104 |
| 2012/0275360 A1* | 11/2012 | Berenberg | ........ | H04W 52/0241 |
| | | | | 370/311 |
| 2015/0327261 A1* | 11/2015 | Thubert | .............. | H04W 74/085 |
| | | | | 370/336 |
| 2016/0021006 A1* | 1/2016 | Vasseur | .................. | H04L 47/24 |
| | | | | 370/235 |
| 2016/0165567 A1* | 6/2016 | Liu | ..................... | H04B 17/318 |
| | | | | 455/456.2 |
| 2017/0195821 A1* | 7/2017 | Lam | ........................ | H04W 4/38 |
| 2018/0026891 A1* | 1/2018 | Vasseur | ................ | H04L 47/127 |
| | | | | 370/235 |
| 2018/0302911 A1* | 10/2018 | Aijaz | .................. | H04W 72/085 |
| 2019/0138295 A1* | 5/2019 | Agerstam | ................. | G06F 8/65 |
| 2020/0007384 A1* | 1/2020 | Mueck | ................... | H04L 43/50 |

\* cited by examiner

NETWORKING METHOD AND SYSTEM FOR WIRELESS NETWORKS

CROSS-REFERENCE TO RELATED APPLICATION

This application claims priority to Chinese Patent Application No. 201910918444.6 filed on Sep. 26, 2019, the entire content of which is incorporated by reference herein.

FIELD OF INVENTION

The present invention generally relates to the technical field of wireless networks, specifically to a networking method and system for wireless sensor networks.

BACKGROUND OF THE INVENTION

With the development of Internet of Things ("IoT") technologies, various types of sensor based local area wireless networks have appeared, such as ZigBee, Bluetooth BLE, Lora, WirelessHart, and so on. An IoT system usually has many sensors, relatively dispersed distribution, and small data volume. Therefore, it requires extremely low power consumption. Usually a single button battery needs to power a sensor for more than five years to achieve the purpose of reducing system and maintenance costs.

Current wireless networks cannot fully meet the needs of most applications in terms of low power consumption. For example, the power consumption of Bluetooth BLE is very low, but Bluetooth BLE can only meet the power consumption requirement of some sensors under certain conditions. With the support of relay nodes, terminal nodes, such as sensors, connected with the relay nodes can reach desired low power consumption using sleep modes when they are not active. But a relay node itself cannot effectively save power because it must maintain relatively active so that the low power terminal nodes it supports can wake up to join the network if desired. For a network with relatively dispersed distribution, a terminal node needs to go through a multi-level multi-path route to reach the root node. As a result, all intermediate relay nodes cannot effectively save power consumption. This kind of networking method can only effectively reduce power consumption at the terminal node level, which is not enough for most applications.

If the power consumption of relay nodes (a.k.a. routing nodes) is ignored, extremely low power consumption at terminal sensor nodes can be easily achieved. And the terminal sensor nodes can establish a Self-Organizing Network ("SON") via complex routing algorithms. Most SON methods follow such an approach. However, for relay nodes, power consumption is also very important. Some relay nodes are also sensor nodes. Replacing batteries for relay nodes is very costly and, in many applications, unacceptable, therefore limiting the development of IoT.

The synchronous sleep method has been used for reducing power consumption at the relay nodes. In this method, relay nodes can sleep and reduce power consumption like other sensor nodes during non-working period. This method is easy to implement in point-to-point communication systems, or in a small network having fewer than twenty nodes. However, when a network has many nodes, the synchronous sleep method can make the network unstable. Once a relay node or terminal node is disconnected, it is difficult for the node to find a suitable access point to join the network again. The uncertainty of the access point can cause excessive loads on some nodes, causing network instability or excessive power consumption.

The adoption of flood broadcasting can be a solution, but there is too much freedom in routing across the network, resulting in excessive power consumption and even network congestion. In a low speed or very low power consumption network, each node needs long sleep time. As such, flooding broadcast can take a long time, for example, several hours of broadcast to find the access point for joining the network. This causes the power consumption of the broadcast node to increase dramatically. And because of the uncertainty of transmission distance, the access point for joining the network may not be the optimal node.

Therefore, there exists a need for a networking method and system for wireless networks that can not only meet the low power consumption requirement on all network nodes but also achieve high level network robustness.

SUMMARY OF THE INVENTION

The present invention discloses a networking method for wireless networks. In one embodiment of the present invention, a network node working as a child node is configured to have a primary parent node and a backup parent node. The network node is configured to have a primary connection relationship with the primary parent node and a backup connection relationship with the backup parent node. A network node working as a parent node is configured to have a first set of child nodes and a second set of child nodes. The network node is configured to have a primary connection relationship with each child node in the first set and a backup connection relationship with each child node in the second set.

During operation, a network node preferentially tries to connect with a first node having the primary connection relationship with the network node in a first connection time window. If the network node fails to connect with the first node under a predetermined condition, the network node tries to connect with a second node having the backup connection relationship with the network node in a second connection time window. After the network node is connected with and finishes communicating with the first or second node, the network node enters into standby or dormant state and tries to establish connection in a subsequent first connection time window or a subsequent second connection time window.

Additionally, if the network node fails to connect with the first node under the predetermined condition, the network node tries to connect with the second node, and after the connection with the second node is successful, the network node is updated to have the primary connection relationship with the second node and the backup connection relationship with the first node. The network node is also updated such that its second connection time window becomes its new first connection time window, and its first connection time window becomes its new second connection time window. Alternatively, the network node is configured to have the backup connection relationship with a new node and its second connection time window is set as a new value.

The present invention also describes a networking system for wireless networks. In one embodiment, the networking system includes a configuration module for configuring a network node working as a child node to have a primary parent node and a backup parent node. The network node is configured to have a primary connection relationship with the primary parent node and a backup connection relationship with the backup parent node. The configuration module may also configure a network node working as a parent node to have a first set of child nodes and a second set of child nodes. The network node is configured to have a primary connection relationship with each child node in the first set and a backup connection relationship with each child node in the second set.

The networking system also includes a networking module for connecting a network node with the node having the primary connection relationship with the network node in a first connection time window. If the network node fails to connect with the first node under a predetermined condition, the network node tries to connect with a second node having the backup connection relationship with the network node in a second connection time window. After the network node is connected with and finishes communicating with the first or second node, the network node enters into a standby or dormant state and tries to establish connection in a subsequent first connection time window or a subsequent second connection time window.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

DETAILED DESCRIPTION

Detailed description of the present invention is provided below along with figures and embodiments, which further clarifies the objectives, technical solutions, and advantages of the present invention. It is noted that schematic embodiments discussed herein are merely for illustrating the invention and different embodiments may be combined. The present invention is not limited to the embodiments disclosed.

Figure 1:
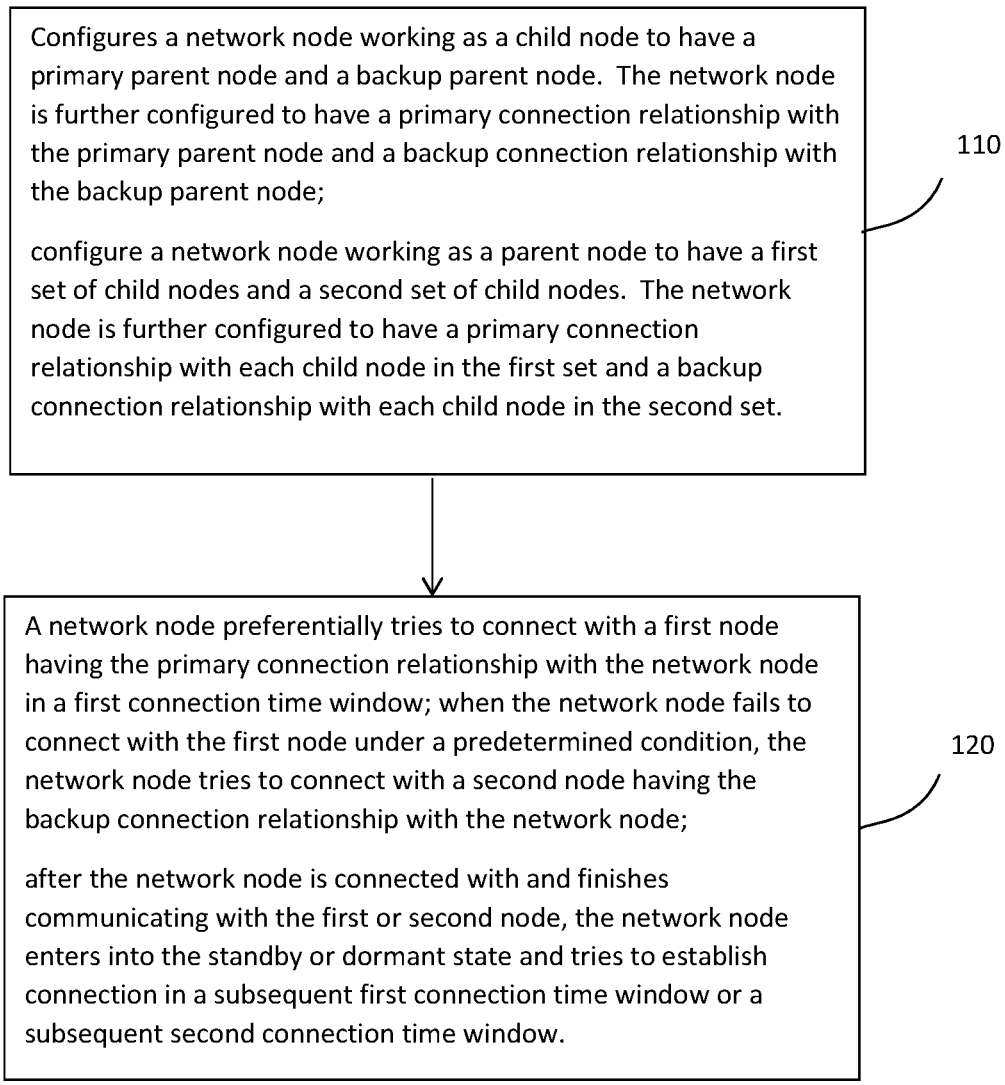
FIG. 1 is a flow diagram showing a networking method for wireless networks according to one embodiment of the present invention.

The present invention describes a networking method for wireless networks. FIG. 1 is a flow diagram showing the networking method according to an embodiment of the present invention.

As shown in step 110, the method configures a network node working as a child node to have a primary parent node and a backup parent node. The network node is further configured to have a primary connection relationship with the primary parent node and a backup connection relationship with the backup parent node.

The method may configure a network node working as a parent node to have a first set of child nodes and a second set of child nodes. The network node may be further configured to have a primary connection relationship with each child node in the first set and a backup connection relationship with each child node in the second set.

Figure 2:
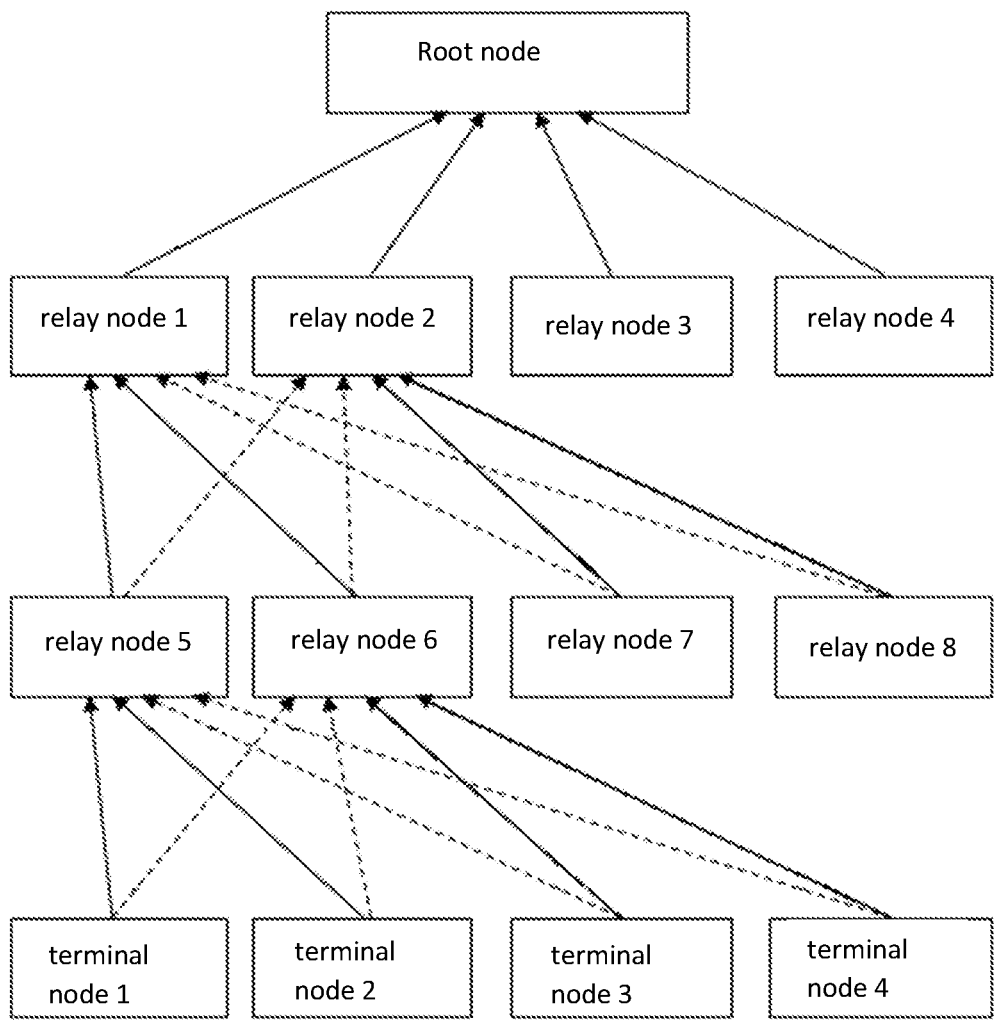
FIG. 2 is a network topology diagram of a local area wireless network.

Specifically, as shown in FIG. 2, there are three types of network nodes in a local area wireless network: root node, relay node, and terminal node. The solid arrow lines in FIG. 2 represent a network node's connection with its primary parent node; and the dashed arrow lines represent a network node's connection with its backup parent node. The root node is a parent node for connecting an external network with the local area wireless network, sending commands to the local area wireless network, and exporting data of the local area wireless network. The root node connects to terminal nodes or relay nodes. There is at least one root node. There may be multiple root nodes, with one configured as the first root node and the other(s) configured as backup root node(s). A relay node can be a parent node of a terminal node or a parent node of another relay node, and it can also be a child node of a root node or another relay node. Relay nodes are used for expanding network structure and relaying communications with other nodes. A terminal node is at the end of a routing path. It can be the child node of a root node or relay node for receiving commands, collecting data, and sending collected data to its parent node. Commands and data are exchanged between parent nodes and child nodes accordingly to achieve communications.

When a network node is a child node, the network node is configured to have a primary parent node and a backup parent node. The network node is configured to have a primary connection relationship with the primary parent node and a backup connection relationship with the backup parent node. The backup connection relationship is set as a backup, which can significantly reduce the probability that the network node is permanently disconnected from the network and improve the robustness of the network.

A parent node may have two different identities, namely, the primary parent node of its child nodes and the backup parent node of its child nodes. Thus, the child nodes of the parent node can be divided into two groups: the first child node set of the parent node as the primary parent node and the second child node set of the parent node as a backup parent node. The parent node has the primary connection relationship with each child node in the first child node set and the backup connection relationship with each child node in the second child node set.

In actual networking configurations, configuration management can be performed from the perspective of the child node, the perspective of the parent node, or both.

In step 120, a network node preferentially tries to connect with a first node having the primary connection relationship with the network node in a first connection time window; when the network node fails to connect with the first node under a predetermined condition, the network node tries to connect with a second node having the backup connection relationship with the network node in a second connection time window.

After the network node is connected with and finishes communicating with the first or second node, the network node enters into the standby or dormant state and tries to establish connection in a subsequent first connection time window or a subsequent second connection time window.

Specifically, in a networking stage, each network node by default connects to other nodes according to its configured primary connection relationships. That is, the network node preferentially tries to connect with its primary parent node (i.e., the parent node having the primary connection relationship with the network node). When the network node fails to connect with the primary parent node under a predetermined condition, the network node tries to establish connection via the backup connection relationship (i.e., connecting with its backup parent node).

A network node adopts the standby or dormant working mechanism. In a local area network, all parent nodes and child nodes have standby or dormant period to achieve low power consumption. A network node can configure its predetermined connection time window(s). The term "connection time window" refers to the time period when the network nodes having a connection relationship are scheduled to be active at the same time. It is usually set as several seconds long. Connection time window makes it convenient for network nodes having a connection relationship to arrange their respective time to successfully establish connection with the least amount of waiting time. As such, network nodes have more time to enter the standby or dormant state to save power consumption. The length of communication after successful connection is not limited by connection time window but is determined by the network nodes according to different applications.

Additionally, if the network node fails to connect with the first node under the predetermined condition, the network node tries to connect with the second node, and after the connection with the second node is successful, the network node is updated to have the primary connection relationship with the second node and the backup connection relationship with the first node. The network node is also updated such that its second connection time window becomes its new first connection time window, and its first connection time window becomes its new second connection time window. Alternatively, the network node is configured to have the backup connection relationship with a new node and its second connection time window is set as a new value.

For example, a child node preferentially tries to connect with its primary parent node which has the primary connection relationship with the child node. When the connection fails under a predetermined condition, the child node tries to connect with the backup parent node which has the backup connection relationship with the child node. If the connection is successful, the child node updates its configuration so that the backup parent node becomes its new primary parent node and its second connection time window becomes its new first connection time window. Thus, the child node will preferentially connect with its new primary parent node in a subsequent new first connection time window. The child node also updates its configuration so that its primary parent node becomes its new backup parent node or simply configures a new backup parent node with a new second connection time window. Thus, the identities of the child node's primary parent node and backup parent node changed. Correspondingly, the identities and composition of the first child node set and the second child node set of the first and backup parent nodes also changed.

Predetermined conditions includes a network node fails to connect with the node having the primary connection relationship with the network node, the load of the parent node in the primary connection relationship exceeds a predetermined load threshold, the remaining power of the parent node in the primary connection relationship is lower than a predetermined charge threshold, the signal strength of any node in the primary connection relationship does not reach the predetermined signal strength threshold, or the distance between the parent node and the root node in the primary connection relationship exceeds a predetermined distance threshold. When one or more conditions in the predetermined conditions are met, the child node does not connect with its primary parent node; instead, the child node connects with its backup parent node.

When the primary connection relationship is used, from a child node's perspective, the child node connects with its primary parent node in the first connection time window; and from a parent node's perspective, the parent node connects with a child node in its first child node set in the first connection time window. When the backup connection relationship is used, from a child node's perspective, the child node connects with its backup parent node in the second connection time window. The second connection time window may be set the same as the first connection time window of the child node or the first connection time window of the backup parent node, or it may be set as other connection time window. From a parent node's perspective, the parent node connects with a child node in its second child node set in the second connection time window. The second connection time window may be set the same as the first connection time window of the parent node or the first connection time window of the child node in the second child node set, or it may be set as other connection time window.

The child nodes having the same primary parent node may be divided into at least one child node group, or the first set of child nodes of the network node may be divided into at least one child node group. Child nodes in the same child node group connects with the parent node within the same connection time window, and child nodes of different child node groups connect with the parent node within different connection time windows.

Specifically, due to limits on network channels, one parent node can only connect to limited number of child nodes at the same time. The child nodes having the same primary parent node may be divided into at least one child node group, or the first set of child nodes of the network node may be divided into at least one child node group. Child nodes in the same child node group connects with the parent node within the same connection time window, and child nodes of different child node groups connect with the parent node within different connection time windows. The primary parent node presets different connection time windows to meet the communication needs of different child node sets.

In one embodiment, there is at least one management node for receiving update information of each network node in a wireless network and sending the update information to other corresponding network nodes. The update information includes a first connection time window, a primary connection relationship, a second connection time window, and a backup connection relationship information.

Specifically, the management node is used to update information of network nodes in the entire wireless network to achieve quick switch between the primary connection relationship and the backup connection relationship and ensure stable connections among network nodes. The management node may be a root node, relay node, or terminal node.

When a network node has multiple backup parent nodes having the backup connection relationship with the network node, the priority of each backup parent node is determined by parameters of the corresponding backup parent node. These parameters include node signal intensity, distance between the node and the root node, residual electric quantity of the node or load of the node.

Specifically, when a child node has more than one backup parent node, the child node ranks the backup parent nodes based on their node parameters so that the backup parent node having the best parameters will be chosen for connection.

In one embodiment, the network node broadcasts its state information to the nearby nodes, scans to obtain the state information of the nearby nodes, and determines the primary connection relationship and the backup connection relationship of the network node according to the state information of the nearby nodes. The state information of a node includes the node's connection time window, distance to the root node, load, signal strength, and residual power information.

Specifically, a connection may be established within the specified connection time window of a parent node. It may also be established by obtaining the state information of the nearby nodes via scanning and by determining the primary connection relationship and the backup connection relationship of the network node according to the state information of the nearby nodes.

A parent node has routing function and maintains a routing table regarding its own downstream child nodes or child node groups. When the parent node receives the information, it firstly determines whether the target address of the information is in the routing table. If so, the parent node forwards the information to the child node via the corresponding path. If not and if the information comes from its child node, then it forwards the information to its parent node. If the information comes from its parent node, it sends a routing error message to the parent node, making the nodes of the whole wireless network communicate with each other via the shortest path.

When the network node tries to connect with the node having the primary connection relationship or the backup connection relationship, the network node sends connection request, the node having the corresponding connection relationship receives the connection request and confirms to connect with the network node. The connection request includes primary connection relationship connection request information, backup connection relationship connection request information, identification or address information of target node requested for connection and identification or address information of the network node itself.

The network node and the node having the primary connection relationship with the network node hold time synchronization or connection time window synchronization.

Figure 3:
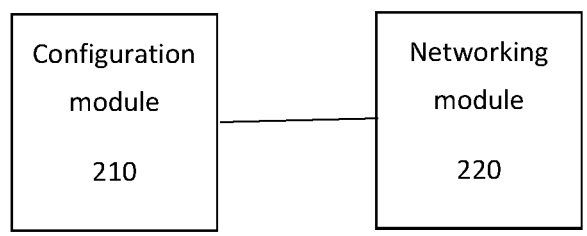
FIG. 3 is a block diagram of a networking system for wireless networks.

In another embodiment of the present invention, the present invention provides a networking system for wireless networks. As shown in FIG. 3, the networking system includes a configuration module 210 for configuring a network node working as a child node to have a primary parent node and a backup parent node. The network node is configured to have a primary connection relationship with the primary parent node and a backup connection relationship with the backup parent node. The configuration module may also configure a network node working as a parent node to have a first set of child nodes and a second set of child nodes. The network node is configured to have a primary connection relationship with each child node in the first set and a backup connection relationship with each child node in the second set.

The networking module 220 is used for connecting a network node with the node having the primary connection relationship with the network node in a first connection time window. If the network node fails to connect with the first node under a predetermined condition, the network node tries to connect with a second node having the backup connection relationship with the network node in a second connection time window. After the network node is connected with and finishes communicating with the first or second node, the network node enters into standby or dormancy state and tries to establish connection in a subsequent first connection time window or a subsequent second connection time window.

The present invention has the following advantages:

A network node preferentially tries to connect with a first node having the primary connection relationship with the network node in a first connection time window; when the network node fails to connect with the first node under a predetermined condition, the network node tries to connect with a second node having the backup connection relationship with the network node in a second connection time window. After the network node is connected with and finishes communicating with the first or second node, the network node enters into standby or dormancy state and tries to establish connection in a subsequent first connection time window or a second connection time window. By using priority or backup routing method and setting connection time window, the power consumption management and networking management mechanism of each node of the network are simplified. Each network node can operate at a low power consumption level. Networking routes have certain degrees of freedom and can meet the network robustness requirements.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A method for a local area wireless network, the method comprising:
    configuring a first network node working as a child node to have a primary parent node and a backup parent node, a primary connection relationship with the primary parent node, and a backup connection relationship with the backup parent node;
    configuring a second network node working as a parent node to have a first set of child nodes and a second set of child nodes, the primary connection relationship with each child node in the first set and the backup connection relationship with each child node in the second set;
    preferentially connecting the first or second network node with a first node having the primary connection relationship with the first or second network node in a first connection time window;
    if the first or second network node fails to connect with the first node under a predetermined condition, connecting the first or second network node with a second node having the backup connection relationship with the first or second network node in a second connection time window;
    after the first or second network node is connected with and finishes communicating with the first or second node, causing the first or second network node to enter a standby or dormant state and to establish connection in a subsequent first connection time window or a subsequent second connection time window; and
    if the first or second network node fails to connect with the first node under the predetermined condition and after the first or second network node successfully connects with the second node, configuring the first or second network node to have the primary connection relationship with the second node and configuring the second connection time window as the first or second network node's new first connection time window.

2. The method of claim 1 further comprising: if the first or second network node fails to connect with the first node under the predetermined condition and after the first or second network node successfully connects with the second node, configuring the first or second network node to have the backup connection relationship with the first node or a new node and configuring the first connection time window or a new connection time window as the first or second network node's new second connection time window.

3. The method of claim 1, wherein the predetermined condition comprises: the load of a parent node in the primary connection relationship exceeds a predetermined load threshold, the remaining power of the parent node in the primary connection relationship is lower than a predetermined charge threshold, the signal strength of any node in the primary connection relationship does not reach a predetermined signal strength threshold, or the distance between the parent node in the primary connection relationship and a root node exceeds a predetermined distance threshold.

4. The method of claim 1 further comprising: dividing child nodes having a same parent node into at least one child node group; connecting child nodes in a same child node group with the same parent node in a same connection time window; and connecting child nodes in different child node groups with the same parent node in different connection time windows.

5. The method of claim 1 further comprising: providing at least one management node for receiving update information of each network node in the local area wireless network and sending the update information to other corresponding network nodes, wherein the update information comprises the corresponding network node's first connection time window, primary connection relationship, second connection time window, and backup connection relationship.

6. The method of claim 1 further comprising: if the first network node has multiple backup parent nodes, each backup parent node having the backup connection relationship with the first network node, determining priority of each backup parent node based on parameters of the corresponding backup parent node, wherein the parameters comprises the corresponding backup parent node's signal intensity, distance to a root node, residual electric quantity, and load.

7. The method of claim 1 further comprising: determining the primary connection relationship and the backup connection relationship of the first or second network node according to state information of the first or second network node's nearby nodes, wherein the first or second network node broadcasts its state information to the nearby nodes and scans the local area wireless network to obtain the state information of the nearby nodes, and wherein state information of each nearby node includes the nearby node's connection time window, distance to the root node, load, signal strength, and residual power information.

8. The method of claim 1, wherein the second network node has a routing process and maintains a routing table regarding its own downstream child nodes or child node groups, and wherein the routing process comprises: when the second network node receives information having a target address, the second network node firstly determines whether the target address is in the routing table; if the target address is in the routing table, the second network node forwards the information to a child node that corresponds to the target address; if the target address is not in the routing table and if the information comes from a child node, the second network nodes forwards the information to a parent node of the second network node; and if the information comes from the parent node, the second network node sends a routing error message to the parent node, making nodes of the local area wireless network communicate with each other via the shortest path.

9. The method of claim 1, wherein the first or second network node tries to connect with a node having the primary connection relationship or the backup connection relationship, the first or second network node sends a connection request, the node having the corresponding primary or backup connection relationship receives the connection request and confirms to connect with the first or second network node, and wherein the connection request includes primary connection relationship connection request information, backup connection relationship connection request information, identification or address information of the node requested for connection, and identification or address information of the first or second network node.

10. The method of claim 1, wherein the first or second network node and all nodes having the primary connection relationship with the first or second network node hold time synchronization or connection time window synchronization.

11. The method of claim 1, wherein the first network node and the second network node are the same node.

12. A networking system for a local area wireless network, the system comprising:
a configuration module for configuring a first network node working as a child node to have a primary parent node and a backup parent node, a primary connection relationship with the primary parent node, and a backup connection relationship with the backup parent node and configuring a second network node working as a parent node to have a first set of child nodes and a second set of child nodes, the primary connection relationship with each child node in the first set and the backup connection relationship with each child node in the second set;
a networking module for preferentially connecting the first or second network node with a first node having the primary connection relationship with the first or second network node in a first connection time window;
if the first or second network node fails to connect with the first node under a predetermined condition, connecting the first or second network node with a second node having the backup connection relationship with the first or second network node in a second connection time window; and
after the first or second network node is connected with and finishes communicating with the first or second node, causing the first or second network node to enter a standby or dormant state and to establish connection in a subsequent first connection time window or a subsequent second connection time window,
wherein if the first or second network node fails to connect with the first node under the predetermined condition and after the first or second network node successfully connects with the second node, the configuration module further configures the first or second network node to have the primary connection relationship with the second node and configures the second connection time window as the first or second network node's new first connection time window.

13. The system of claim 12, wherein if the first or second network node fails to connect with the first node under the predetermined condition and after the first or second network node successfully connects with the second node, the configuration module further configures the first or second network node to have the backup connection relationship with the first node or a new node and configures the first connection time window or a new connection time window as the first or second network node's new second connection time window.

14. The system of claim 12, wherein the predetermined condition comprises: the load of a parent node in the primary connection relationship exceeds a predetermined load threshold, the remaining power of the parent node in the primary connection relationship is lower than a predetermined charge threshold, the signal strength of any node in the primary connection relationship does not reach a predetermined signal strength threshold, or the distance between the parent node in the primary connection relationship and a root node exceeds a predetermined distance threshold.

15. The system of claim 12 further comprising: at least one management node for receiving update information of each network node in the local area wireless network and sending the update information to other corresponding network nodes, wherein the update information comprises the corresponding network node's first connection time window, primary connection relationship, second connection time window, and backup connection relationship.

16. The system of claim 12, wherein the configuration module determines the primary connection relationship and the backup connection relationship of the first or second network node according to state information of the first or second network node's nearby nodes, wherein the first or second network node broadcasts its state information to the nearby nodes and scans the local area wireless network to obtain the state information of the nearby nodes, and wherein state information of each nearby node includes the nearby node's connection time window, distance to the root node, load, signal strength, and residual power information.

17. The system of claim 12, wherein the first or second network node tries to connect with a node having the primary connection relationship or the backup connection relationship, the first or second network node sends a connection request, the node having the corresponding primary or backup connection relationship receives the connection request and confirms to connect with the first or second network node, and wherein the connection request includes primary connection relationship connection request information, backup connection relationship connection request information, identification or address information of the node requested for connection, and identification or address information of the first or second network node.

18. The system of claim 12, wherein the first network node and the second network node are the same node.

* * * * *